May 22, 1923.
G. E. DENNIS
RADIUS ROD SHOCK ABSORBER
Filed Nov. 19, 1920
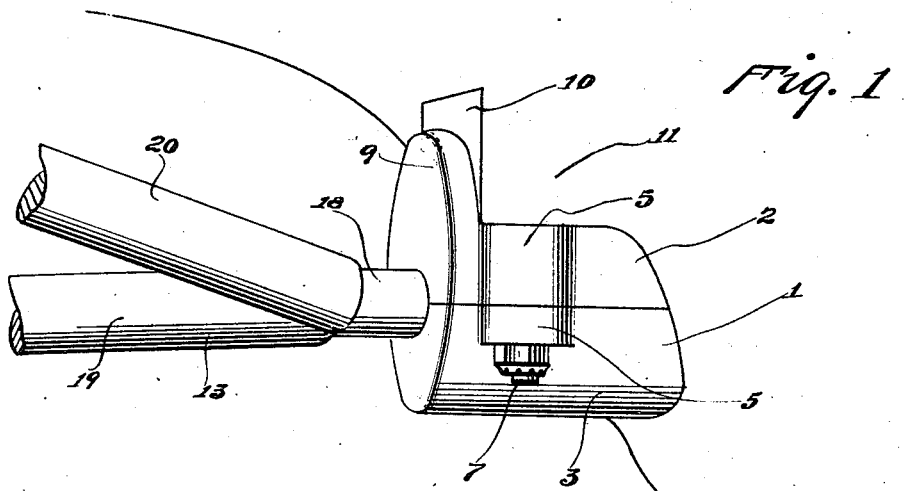
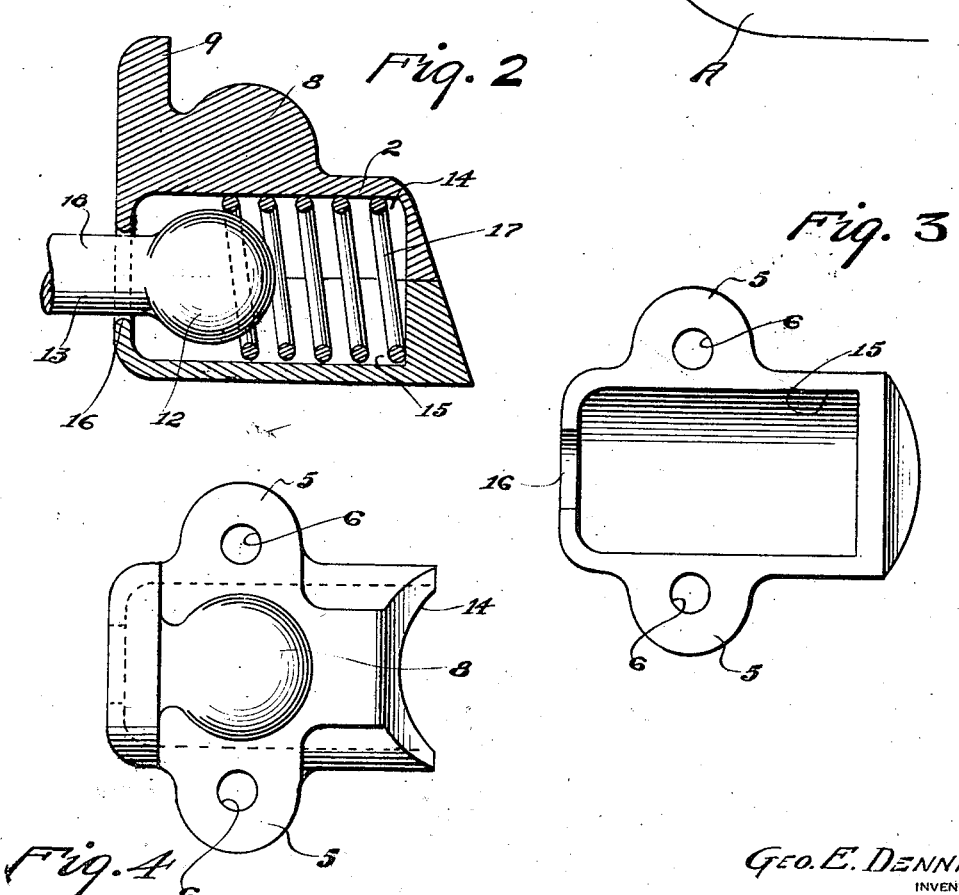

Patented May 22, 1923.

1,456,368

UNITED STATES PATENT OFFICE.

GEORGE E. DENNIS, OF WAUKESHA, WISCONSIN.

RADIUS-ROD SHOCK ABSORBER.

Application filed November 19, 1920. Serial No. 425,243.

*To all whom it may concern:*

Be it known that I, GEORGE E. DENNIS, a citizen of the United States, residing at Waukesha, in the county of Waukesha and State of Wisconsin, have invented new and useful Improvements in Radius-Rod Shock Absorbers, of which the following is a specification.

This invention relates to a shock absorber for the radius rods of a Ford automobile and an object of the invention is to provide a shock absorber of the radius rod which prevents shocks and vibrations being transmitted from the radius rods to the crank case when the vehicle wheels strike an obstruction and one which also protects the radius rod against bending and the consequent disalignment of the wheels, thereby eliminating the danger of improper action of the steering apparatus.

Another object of the invention is to provide a cushion attachment for the radius rod of Ford automobiles which may be applied to the crank case without requiring alterations to either crank case or radius rod, providing a socket member carrying a cushion, in which socket member and against which cushion the ball of the radius rod extends and a socket member which is constructed to provide a plurality of points of support for relieving the attaching studs of strain.

Other objects of the invention will appear in the following description taken in connection with the accompanying drawing wherein:

Fig. 1 is a perspective view of the improved radius rod shock absorber showing it attached.

Fig. 2 is a longitudinal section through the radius rod shock absorber.

Fig. 3 is a top plan of the lower section of the socket of the radius rod shock absorber.

Fig. 4 is a plan of the upper section of the socket of the radius rod shock absorber.

Referring more particularly to the drawings, the radius rod shock absorber comprises a socket 1 formed of upper and lower members 2 and 3 respectively which are cast of any suitable material and have laterally positioned bosses 5 on their sides, provided with a suitable opening 6 which receive therethrough the attaching studs 7. The attaching studs 7 serve the dual function of attaching the socket 1 to the crank case A of the the motor vehicle and of clamping the sections 2 and 3 together. The upper section 2 is provided with a substantially semi-spherical projection 8 on its surface, the forward end of which merges into the upwardly extending flange 9 on the forward end of the section 2, which flange abuts the shoulder 10 formed on the crank case A. The substantially semi-spherical projection 8 is provided for fitting in the socket (not shown) which is formed in the projection 11 on the crank case A for receiving the ball 12 of the radius rod 13, for filling this socket and further providing an increased bearing surface for the socket 1 and crank case A. The sections 2 and 3 of the socket member 1 are provided with longitudinally extending substantially semi-cylindrical recesses 14 and 15 respectively, in their inner surface, which are constricted as shown at 16, at the forward end of the socket member, and the cushion spring 17 is positioned within the substantially cylindrical opening or bore formed by the semi-cylindrical recesses 14 and 15.

The stem 18 of the radius rod 13, which stem is formed at the junction of the diverging arms 19 and 20 of the radius rod, extending through the constricted opening 16 of the bore of the socket member, and the ball or sphere 12 formed on the end of the stem 13 projects into the socket and engages against the cushion spring 17 which spring is provided for absorbing shocks and vibrations transmitted to the radius rod from the front wheels of the vehicle.

From the foregoing description taken in connection with the accompanying drawings, it will be apparent that a shock absorber has been provided for attaching the radius rod 13 to the crank case A which will permit such attachment, without alteration of either radius rod or crank case, to utilize the sphere or ball 12 on the end of the radius rod, having abutment against the cushion spring and it will be further seen that since the inner ends of the socket members 2 and 3 are shaped to snugly fit against the facing surface of the crank case A that a plurality of points of support and abutment are provided which will greatly diminish strain upon the studs 7, preventing accidental disconnection of the socket member 1 with the crank case as well as preventing the socket member from becoming loose.

It is, of course, to be understood that the invention may be constructed in various other manners and the parts associated in other relations and, therefore, I do not desire to be limited in any manner except as set forth in the claims hereunto appended.

Having thus described my invention what I claim is:

1. A shock absorbing attaching device for radius rods comprising a pair of detachably connected socket members recessed to form a radius rod receiving bore, and shock absorbing means in said bore, one of said socket members provided with a substantially semi-spherical enlargement on its crank case engaging surface.

2. A shock absorbing attaching device for radius rods comprising a pair of detachably connected socket members recessed to form a radius rod receiving bore, and shock absorbing means in said bore, one of said socket members provided with a substantially semi-spherical enlargement on its crank case engaging surface, and an upstanding abutment flange formed on said last named socket member in close proximity to said substantially semi-spherical enlargement.

3. The combination with a crank case having a radius rod attaching projection thereon, a radius rod, and a ball on one end of said rod, of a pair of socket members recessed to form a bore for receiving said ball, means for connecting said socket members and attaching them to said crank case projection, and cushioning means in said bore and engaging said ball, the one of said socket member facing said crank case being cut at an acute angle to the horizontal to lie in facial abutment with the adjacent portion of the crank case and enlargement.

4. A shock absorbing attaching device for radius rods comprising a pair of detachably connected socket members recessed to form a radius rod receiving bore, a spring in said bore, said spring being tensioned to apply pressure to a radius rod in direct alignment with its longitudinal movement, one of said socket members provided with a substantially semi-spherical enlargement on its crank case engaging surface.

5. The combination with a motor vehicle crank case having a radius rod attaching projection thereon, a radius rod having a ball on one end thereof, of a pair of socket members recessed to form a bore extending longitudinally of the radius rod, a spring within said bore and engaging the ball on the radius rod, said spring being tensioned to apply pressure to the radius rod in direct alignment with its longitudinal movement, one of said socket members provided with a substantially semi-spherical projection adapted to fit in the crank case carried recess normally receiving the sphere on the end of the radius rod, and an abutment flange on the last named socket member adjacent said semi-spherical projection.

In testimony whereof I affix my signature.

GEORGE E. DENNIS.